US008711812B2

(12) United States Patent
Quan et al.

(10) Patent No.: US 8,711,812 B2
(45) Date of Patent: Apr. 29, 2014

(54) METHOD, DEVICE, AND SYSTEM FOR CONFIGURING COMPONENT CARRIER IN CARRIER AGGREGATION SCENARIO

(75) Inventors: Wei Quan, Beijing (CN); Yi Jiang, Beijing (CN); Jian Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 193 days.

(21) Appl. No.: 13/407,381

(22) Filed: Feb. 28, 2012

(65) Prior Publication Data

US 2012/0155272 A1 Jun. 21, 2012

Related U.S. Application Data

(63) Continuation of application No. PCT/CN2010/075294, filed on Jul. 20, 2010.

(30) Foreign Application Priority Data

Aug. 28, 2009 (CN) .......................... 2009 1 0171412

(51) Int. Cl.
*H04W 4/00* (2009.01)

(52) U.S. Cl.
USPC ........... 370/332; 370/230; 455/453; 455/442; 455/436

(58) Field of Classification Search
USPC .............. 370/230, 229, 230.1, 232, 233, 234, 370/235, 330, 331, 332; 455/436, 437, 438, 455/439, 442, 452.2, 453
See application file for complete search history.

(56) References Cited

U.S. PATENT DOCUMENTS

2007/0025458 A1 2/2007 Kaminski et al.

FOREIGN PATENT DOCUMENTS

| CN | 1809217 A | 7/2006 |
|---|---|---|
| CN | 1909530 A | 2/2007 |
| CN | 101005343 A | 7/2007 |
| CN | 101115282 A | 1/2008 |
| CN | 101312551 A | 11/2008 |
| CN | 101345970 A | 1/2009 |
| CN | 101431769 A | 5/2009 |
| WO | WO 2009/082160 A1 | 7/2009 |
| WO | WO2010088930 * | 8/2010 |

OTHER PUBLICATIONS

Written Opinion of the International Searching Authority issued in corresponding PCT Patent Application No. PCT/CN2010/075294, mailed Nov. 4, 2010.

(Continued)

*Primary Examiner* — Dady Chery
(74) *Attorney, Agent, or Firm* — Brinks Gilson & Lione

(57) ABSTRACT

Embodiments of the present invention provide a method, a device, and a system for configuring a component carrier in a carrier aggregation scenario. The method for configuring a component carrier in a carrier aggregation scenario includes: obtaining information about a component carrier supported by a UE; selecting a candidate component carrier according to the information about the component carrier and configuring a resource parameter that is applied to the candidate component carrier to form configuration information about the candidate component carrier; and delivering the configuration information about the candidate component carrier to the UE. In the embodiments of the present invention, a base station may select a candidate component carrier for the UE according to obtained component carrier support information and perform resource configuration, so that the UE can accurately know to which component carrier a resource parameter is applied, and thus a data transmission error may be reduced.

12 Claims, 4 Drawing Sheets

(56) References Cited

OTHER PUBLICATIONS

International Search Report issued in corresponding PCT Patent Application No. PCT/CN2010/075294, mailed Nov. 4, 2010.
Nokia Corp, "Indication of Persistent Allocation for UL" Agenda Item 5.1.1.8, 3GPP TSG-RAN WG2 Meeting #62. Kansas City, USA, May 5-9, 2008. R2-082304.
Catt, "The Reliability of SPS Activation" Agenda Item 6.1.1.9, 3GPP TSG-RAN2 Meeting #64. Czech Republic, Nov. 10-14, 2008. R2-086490.
LTE, "$3^{rd}$ Generation Partnership Project; Technical Specification Group Radio Access Network; Evolved Universal Radio Access (E-UTRA) Radio Resource Control (RRC); Protocol Specification" (Release 8) 3GPP TS 36.331. V8.6.0, Jun. 2009.
LTE, "$3^{rd}$ Generation Partnership Project; Technical Specification Group Radio Access Network; Evolved Universal Radio Access (E-UTRA) Medium Access Control (MAC) Protocol Specification" (Release 8) 3GPP TS 36.321. V8.6.0, Jun. 2009.
Office Action issued in corresponding Chinese Patent Application No. 200910171412.0, mailed Sep. 27, 2012.
Extended European Search Report issued in corresponding European Patent Application No. 10811202.0, mailed Jul. 16, 2012.
Chang et al., "A Fractional Soft Handover Scheme for 3GPP LTE-Advanced System" IEEE 2009.
Zhao et al., "Analysis on Multi-Bandwidth UE Coexistence in OFDMA System" Third International Conference on Communications and Networking in China, ChinaCom 2008.
Office Action issued in corresponding Chinese Patent Application No. 200910171412.0, mailed Apr. 25, 2013, 11 pages.

* cited by examiner

METHOD, DEVICE, AND SYSTEM FOR CONFIGURING COMPONENT CARRIER IN CARRIER AGGREGATION SCENARIO

CROSS-REFERENCE TO RELATED APPLICATIONS

This application is a continuation of International Application No. PCT/CN2010/075294, filed on Jul. 20, 2010, which claims priority to Chinese Patent Application No. 200910171412.0, filed on Aug. 28, 2009, both of which are hereby incorporated by reference in their entireties.

FIELD OF THE INVENTION

The present invention relates to the field of mobile communication technologies, and in particular, to a method, a device, and a system for configuring a component carrier in a carrier aggregation scenario.

BACKGROUND OF THE INVENTION

LTE (Long Term Evolution) is an evolved network of a universal mobile communication system. A purpose of the LTE is to provide a low-cost network capable of reducing a delay, raising a user data rate, and increasing system capacity and coverage. In LTE-A (Long Term Evolution Advanced), a new network feature is introduced on the basis of the LTE, such as CA (Carrier Aggregation), that is, each CA cell has multiple CCs (Component Carriers) and each CC may be regarded as a single-carrier cell of the LTE, so that a CA cell of the LTE-A has a higher bandwidth and a larger throughput.

In an LTE/LTE-A system, before data is transmitted between a base station base station and a UE (User Equipment), the base station needs to first configure a transmission resource used by the UE, where the transmission resource is hereinafter referred to as a resource, and may include a frequency channel and a time-frequency resource.

In the LTE system, according to a service feature and through a PDCCH (Physical Downlink Control Channel) command, and an RRC (Radio Resource Control Connection Reconfiguration,) message, the base station configures a resource used by the UE, which may include configuring parameters such as physical resource information, MCS (Modulating and Coding Scheme) modulation and coding information, and a resource scheduling period.

A multi-carrier technology is introduced in the LTE-A system, which is obviously advantageous over a single-carrier approach in terms of performance such as spectrum efficiency and information amount of transmission. However, in a multi-carrier scenario, how the base station configures each parameter of the resource is not specified. In a process of implementing embodiments of the present invention, the inventor finds that, if a conventional method for configuring a resource in an LTE system is still used to configure a related parameter, the UE cannot accurately know to which component carrier the resource parameter is applied, so that data may fail to be transmitted or a transmission error occurs.

SUMMARY OF THE INVENTION

Embodiments of the present invention provide a method, a device, and a system for configuring a component carrier in a carrier aggregation scenario, so that a UE can accurately know a configuration situation of a component carrier.

In order to solve the foregoing technical problem, the technical solutions in the embodiments of the present invention are as follows:

A method for configuring a component carrier in a carrier aggregation scenario includes: obtaining information about a component carrier supported by a user equipment (UE); selecting a candidate component carrier according to the information about the component carrier and configuring a resource parameter that is applied to the candidate component carrier to form configuration information about the candidate component carrier; and delivering the configuration information about the candidate component carrier to the UE.

Accordingly, a base station includes: an obtaining module, adapted to obtain information about a component carrier supported by a user equipment (UE); a selecting module, adapted to select a candidate component carrier according to the information about the component carrier; a configuring module, adapted to configure a resource parameter that is applied to the candidate component carrier to form configuration information about the candidate component carrier; and a delivering module, adapted to deliver the configuration information about the candidate component carrier to the UE.

Accordingly, a mobile terminal includes: a reporting module, adapted to report information about a supported component carrier to a base station; and a configuration receiving module, adapted to receive configuration information about a candidate component carrier.

Accordingly, a system for configuring a component carrier in a carrier aggregation scenario includes: a base station, adapted to obtain information about a component carrier supported by a user equipment (UE); select a candidate component carrier according to the information about the component carrier and configure a resource parameter that is applied to the candidate component carrier to form configuration information about the candidate component carrier; and deliver the configuration information about the candidate component carrier to the UE.

Accordingly, a system for configuring a component carrier in another carrier aggregation scenario includes: a mobile terminal, adapted to report information about a supported component carrier to a base station; and receive configuration information about a candidate component carrier, where the configuration information about the candidate component carrier is delivered by the base station.

In the embodiments of the present invention, the base station may select, according to obtained support information about a component carrier, a candidate component carrier for the UE, and perform resource configuration, so that after receiving configuration information about the component carrier, the UE can accurately know to which component carrier a resource parameter is applied, and thus data transmission may be performed and a data transmission error may be reduced.

DETAILED DESCRIPTION OF THE EMBODIMENTS

The technical solutions of the present invention are described in the following with reference to the accompanying drawings and the embodiments.

Figure 1:
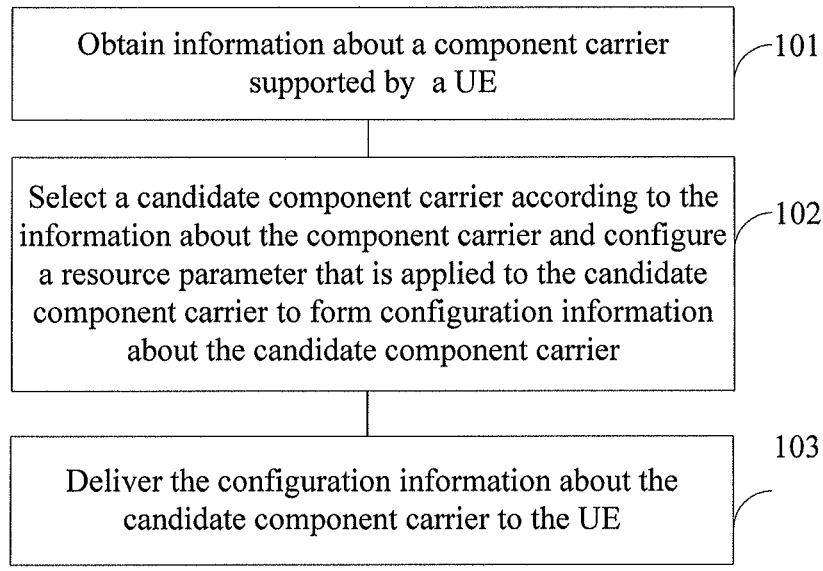
FIG. 1 is a flowchart of a method for configuring a component carrier in a carrier aggregation scenario according to an embodiment of the present invention.

FIG. 1 is a flowchart of a method for configuring a component carrier in a carrier aggregation scenario according to an embodiment of the present invention.

The method may include:

Step 101: Obtain information about a component carrier supported by a user equipment (UE).

When initiating a service in LTE-A, the UE may report the information about the component carrier supported by the UE to a base station, and the support information may also be queried and obtained by the base station from the UE, and a core network may also notify the base station of capability that is reported by the UE at the time of attachment, and the support information may also be reported by the UE to the base station at the time of establishing an RRC connection, or may be reported to the base station through an uplink information transfer (UL Information Transfer) message at the time of initiating a service. The information may include a supported component carrier and the number of supported component carriers, a supported Band List EUTRA (supported EUTRA (Enhanced Universal Terrestrial Radio Access) band list), and Meas Parameters (measurement parameters).

Step 102: Select a candidate component carrier according to the information about the component carrier and configure a resource parameter that is applied to the candidate component carrier to form configuration information about the candidate component carrier.

After the base station obtains the support information, when a relevant parameter of a resource needs to be configured for the UE, the base station may select a candidate component carrier according to factors such as the component carrier supported by the UE and a load of each component carrier in a cell, and configure resource parameters that are applied to the candidate component carrier, such as a period, a PUCCH (Physical Uplink Control Channel) resource, the number of HARQ (Hybrid Automatic Repeat Request) processes for semi-static scheduling, and a condition for implicit release of a semi-static scheduling resource.

For details about how to select the candidate component carrier, reference may be made to the description of subsequent embodiments.

Step 103: Deliver the configuration information about the candidate component carrier to the UE.

The base station delivers the configuration information about the candidate component carrier, that is, information about a component carrier selected for the UE and information about a configured parameter, to the UE, so that when necessary, by applying a relevant parameter of a configuration resource to a corresponding component carrier, the UE may activate, modify, and release a resource to complete scheduling of the resource and handover on each component carrier.

In this embodiment of the present invention, the base station may select, according to obtained component carrier support information, the candidate component carrier for the UE, and perform resource configuration, so that after receiving configuration information about the component carrier, the UE can accurately know to which component carrier a resource parameter is applied, and thus data transmission may be performed and a data transmission error may be reduced. A specific implementation process of the method in the present invention is described in the following with reference to a specific embodiment.

Figure 2:
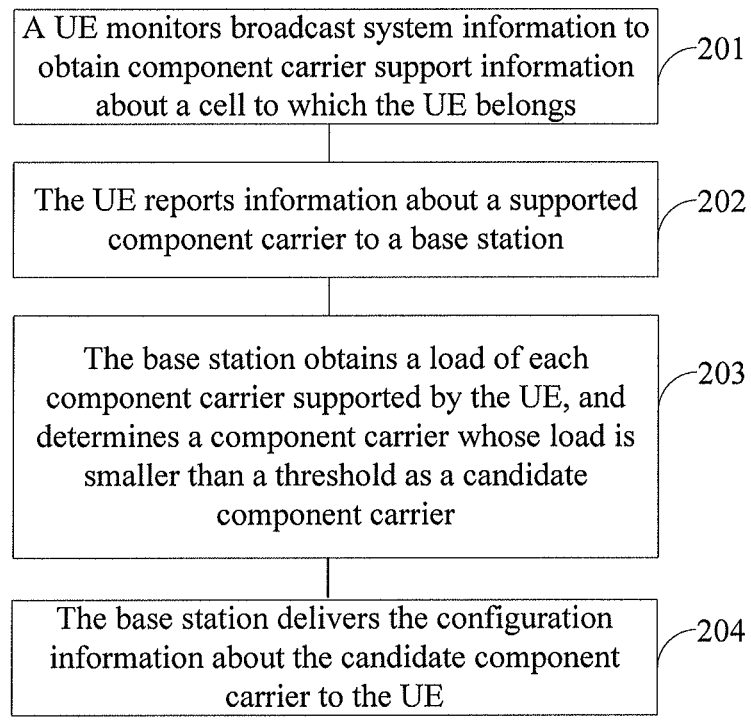
FIG. 2 is a flowchart of a method for configuring a component carrier in another carrier aggregation scenario according to an embodiment of the present invention.

FIG. 2 is a flowchart of a method for configuring a component carrier in another carrier aggregation scenario according to an embodiment of the present invention.

The method may include:

Step 201: A UE monitors broadcast system information to obtain component carrier support information about a cell to which the UE belongs.

The cell broadcasts the component carrier support information about the cell through system information, and the UE may obtain the total number of component carriers of the cell and relevant status information through monitoring and measurement. The monitoring may be continuous real-time monitoring, may also be timed periodic monitoring, and may also be event-driven monitoring, that is, monitoring is based on a requirement, which may be set according to a specific requirement.

Step 202: The UE reports information about a supported component carrier to a base station.

The support information includes the supported component carrier and the number of supported component carriers, and a supported Band List EUTRA and Meas Parameters. The UE may report the information to the base station by forming the information into a data table.

In this embodiment, the base station obtains, through steps 201 to 202, information about a component carrier supported by the UE. Definitely, the information may also be obtained by other means.

Step 203: The base station obtains a load of each component carrier supported by the UE, and determines a component carrier whose load is smaller than a threshold as a candidate component carrier.

A process that the base station selects the candidate component carrier may be firstly listing each component carrier reported by the UE, then invoking and loading a load situation of each component carrier to the list, and then performing selection from the list according to the load situation. The base station maintains application status information about all component carriers under the base station, and may search and find, according to information such as the name of a component carrier, whether the component carrier has been allocated to another terminal, and/or according to the number of terminals that are allocated the component carrier, and a current application status of the component carrier, a load value of each component carrier is obtained by calculating a parameter for measuring an application status of each component carrier according to a certain proportional relationship. The larger the load value is, allocability of a component carrier is lower. The proportional relationship may be set according to a configuration requirement of the base station. A sorting order of loads of each component carrier reported by the UE is obtained by comparing load values of each component carrier, and a component carrier whose load value is smaller than a threshold is served as a candidate component carrier that is allocated by the base station to the UE. The threshold may be a preset fixed value, and may also be a dynamic value, for example, candidate component carriers are component carriers corresponding to the first three or the first several load values in a list in which load values are sorted in ascending order.

In this step, according to factors such as each component carrier reported by the UE and a load of each component carrier of the base station itself, the base station may configure for the UE a set of candidate component carriers and a resource parameter shared by the set, and may also configure for the UE one or multiple candidate component carriers and a resource parameter that is applied to a corresponding component carrier, that is, a resource parameter is corresponding to a component carrier in a one-to-one manner. For example:

a component carrier 1, a semi-static scheduling period T1, a PUCCH resource S1, the number of HARQ processes N1, and a condition for implicit release H1;

a component carrier 2, a semi-static scheduling period T2, a PUCCH resource S2, the number of HARQ processes N2, and a condition for implicit release H2;

. . .

Step 204: The base station delivers the configuration information about the candidate component carrier to the UE.

The base station may form the configuration information about the candidate component carrier, namely, information about the candidate component carrier and information about a resource parameter configured for the candidate component carrier, into a data table and sends the data table to the UE through an RRC message.

In this embodiment, after the UE obtains, by monitoring a system broadcast, the information about the component carrier supported by the UE, and reports the information to the base station, the base station selects and configures the candidate component carrier, so that after receiving configuration information about the component carrier, the UE can accurately know to which component carrier a resource parameter is applied, and therefore, data transmission may be performed, and a data transmission error may be reduced.

Figure 3:
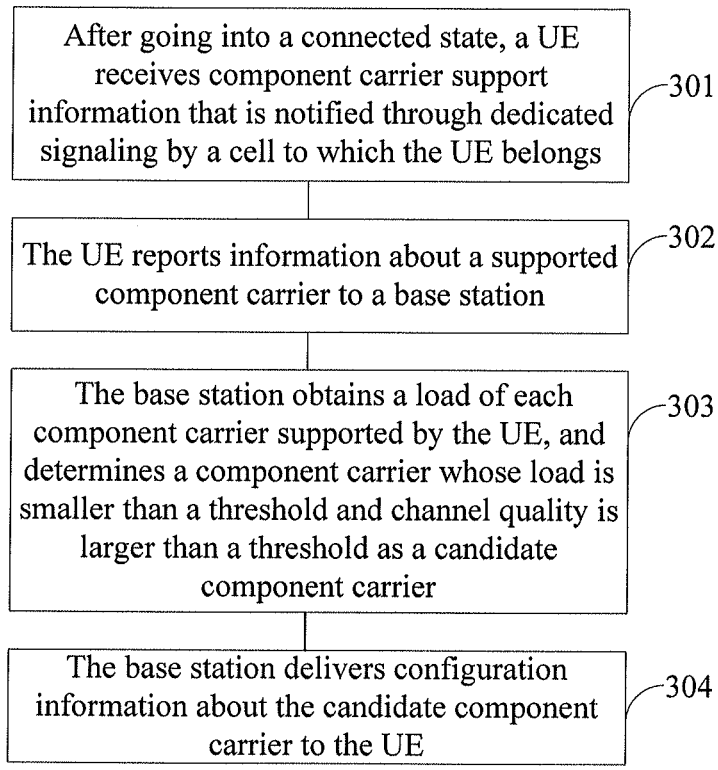
FIG. 3 is a flowchart of a method for configuring a component carrier in another carrier aggregation scenario according to an embodiment of the present invention.

FIG. 3 is a flowchart of a method for configuring a component carrier in another carrier aggregation scenario according to an embodiment of the present invention.

The method may include:

Step 301: After going into a connected state, a UE receives component carrier support information that is notified through dedicated signaling by a cell to which the UE belongs.

In this step, the UE may obtain the component carrier support information by receiving a dedicated signaling notification. Reception of the notification may be real-time continuous reception, may also be timed periodic reception, and may also be event-driven reception, that is, reception is based on a requirement, which may be set according to a specific requirement. The UE obtains the component carrier support information by receiving the dedicated signaling notification, so that the support information is more accurate.

Step 302: The UE reports information about a supported component carrier to a base station.

In addition to the supported component carrier and the number of supported component carriers, and a supported Band List EUTRA and Meas Parameters, the support information may further include a channel condition of each component carrier received by the UE, for example, RSRP (Reference Signal Received Power) and RSRQ (Reference Signal Received Quality), which can be used when the base station configures a component carrier and a resource parameter for the UE.

The reporting by the UE to the base station may be real-time reporting, or timed reporting, or event-driven reporting to the base station, so that new configuration information is obtained in time, and thus accuracy of data transmission is improved.

In this embodiment, the base station obtains, through steps 301 to 302, information about a component carrier supported by the UE. Definitely, the information may also be obtained by other means.

Step 303: The base station obtains a load of each component carrier supported by the UE, and determines a component carrier whose load is smaller than a threshold and channel quality is larger than a threshold as a candidate component carrier.

In this step, a process that the base station selects the candidate component carrier is similar to the corresponding step 203 in the foregoing embodiment, and may also be firstly listing each component carrier reported by the UE, then invoking and loading a load situation of each component carrier and a channel quality situation of each component carrier to the list, and then performing selection from the list according to the load situation and the channel quality situation.

The base station obtains a load value of each component carrier by using a method similar to that in the foregoing embodiment, and meanwhile, may obtain a channel quality reference value of a corresponding component carrier according to a relevant parameter of channel quality of each component carrier and a certain proportional relationship. A process that the base station selects a candidate carrier may be selecting one or multiple component carriers whose load value is smaller than a threshold and channel quality reference value is larger than a threshold from the list as a candidate component carrier, where the list includes load values and channel quality reference values. The specific number of selected component carriers and a value of parameter threshold, and a threshold are determined by the base station.

In another embodiment of the present invention, the base station may also select and determine a candidate component carrier according to only channel quality of a component carrier, and take a component carrier with best channel quality as a candidate component carrier or take the first several component carriers with better channel quality as candidate component carriers.

In this step, the base station may configure for the UE one or multiple candidate component carriers and a resource parameter that is applied to a corresponding component carrier, and may also configure a set of candidate component carriers for the UE. The set is a subset of a set of all component carriers of the cell to which the UE belongs. Meanwhile, the base station configures a set of parameters of a required resource for the UE, and the parameters may be applied to each component carrier in the set of component carriers. For example:

a set of component carriers: a component carrier 1, a component carrier 2, . . . ; and parameters applied to the set of component carriers: a semi-static scheduling period T1, a PUCCH resource S, the number of HARQ processes N, and a condition for implicit release H.

Step 304: The base station delivers configuration information about the candidate component carrier to the UE.

The configuration information about the candidate component carrier, namely, information about the candidate component carrier and a resource parameter configured for the candidate component carrier, may be sent to the UE through an RRC message.

In this embodiment, after the UE obtains, by receiving a dedicated signaling notification, the information about the component carrier supported by the UE, and reports the information to the base station, the base station selects and configures the candidate component carrier, so that after receiving the configuration information about the component carrier, the UE can accurately know to which component carrier the resource parameter is applied, and therefore, data transmission may be performed, and a data transmission error may be reduced.

Furthermore, when a relevant parameter is configured by applying a conventional method for configuring a resource in an LTE system, when a component carrier used by the UE changes, a resource parameter needs to be reconfigured through an RRC message, causing a problem of signaling waste and a delay problem. In this embodiment of the present invention, the base station can configure for the UE, at a time, a set of component carriers and a parameter that may be applied to multiple component carriers, so that when a certain component carrier used by the UE changes, a set of candidate component carriers allocated by the base station may be searched, and because resource parameters of the component carriers in the set are the same, the UE may be directly handed over to another configured component carrier in the set, so that a resource parameter does not to be reconfigured, thus saving a signaling overhead and reducing a delay. Meanwhile, configuration consistency of component carriers between the UE and the base station can be maintained, and a correct operation of the UE can be maintained.

The method of each foregoing embodiment may not only be applied to first component carrier configuration that is performed by the base station on the UE, but also be applied to operations, such as addition, modification, and deletion, performed by the base station on component carrier configuration of the UE, which is described in the following through a specific embodiment.

Figure 4:
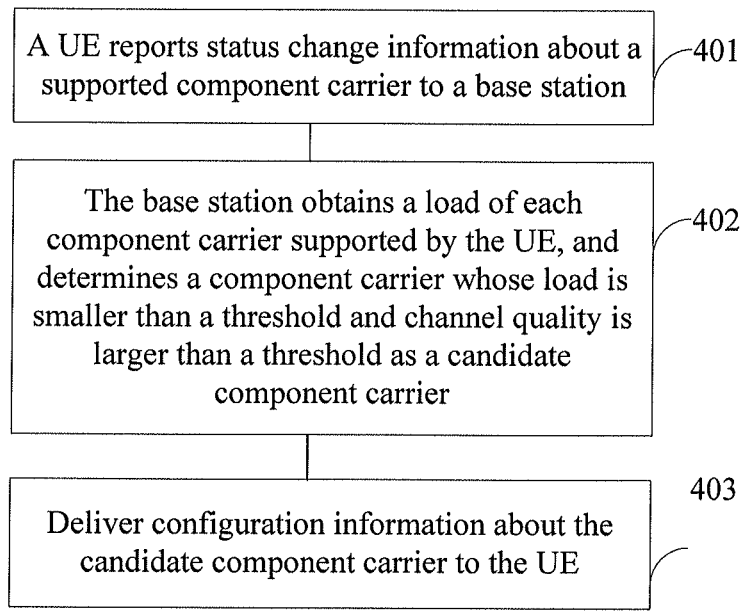
FIG. 4 is a flowchart of a method for configuring a component carrier in another carrier aggregation scenario according to an embodiment of the present invention.

FIG. 4 is a flowchart of a method for configuring a component carrier in another carrier aggregation scenario according to an embodiment of the present invention.

The method may include:

Step 401: A UE reports status change information about a supported component carrier to a base station.

When channel quality of a candidate component carrier allocated by the base station for the UE changes, or channel quality of a component carrier supported by a UE side changes, or a new component carrier that is supported by the UE appears, the UE may report change information about the supported component carrier to the base station. The reported change information may include a name of a component carrier and the number of component carriers that change, and may further include changed status information, for example, an original level and a latest level of channel quality of a certain component carrier.

In a process that a service is continuously ongoing, the UE may report change information about a component carrier in a real-time manner, in a timed manner by setting a timer, or in an event-driven manner based on a requirement. The UE may also set a threshold for the channel quality of the component carrier. When channel quality of a component carrier applied by the UE side changes and reaches a certain threshold, or channel quality of a component carrier that is being used is smaller than a certain threshold, the UE may be triggered to report the change information, so that the UE makes a timely report, and thus the base station reconfigures a candidate component carrier and a resource parameter for the UE according to the reported change information when necessary.

Step 402: The base station obtains a load of each component carrier supported by the UE, and determines a component carrier whose load is smaller than a threshold and channel quality is larger than a threshold as a candidate component carrier.

The base station performs an analysis according to a change situation of a component carrier on the UE side or channel quality of the component carrier one the UE side, and if necessary, modifies the component carrier used by the UE or the set of component carriers used by the UE, for example, adds or deletes a component carrier, or modifies some parameters. For example, for the change information about the component carrier, where the change information is reported by the UE, the base station may delete, according to a load threshold and a channel quality reference value, a component carrier that is originally allocated to the UE but whose channel quality becomes smaller than a threshold, and reallocate a new component carrier that meets the preceding two conditions to the UE.

Step 403: Deliver configuration information about the candidate component carrier to the UE.

The base station notifies the UE of the configuration information about the candidate component carrier, namely, information about a modified candidate component carrier and information about a modified resource parameter, through an RRC message.

After the UE receives the candidate component carrier and the resource parameter that are configured by the base station, if a resource is in an active state on a component carrier, and the UE receives a resource activation command, but the command indicates that the resource is on another component carrier, the UE uses a new resource activation command to apply a new resource to a reconfigured component carrier, and meanwhile, release a resource on an original component carrier.

In this embodiment, the UE reports a change situation of the supported component carrier, so that the base station adjusts or modifies configuration of the component carrier of the UE in time, and therefore, the UE may perform data transmission on a newly configured component carrier more effectively.

Persons of ordinary skill in the art may understand that all or part of steps in the methods of the preceding embodiments may be implemented by a program instructing relevant hardware. The program may be stored in a computer readable storage medium, and when the program is executed, including the following steps:

obtaining information about a component carrier supported by a UE;

selecting a candidate component carrier according to the information about the component carrier and configuring a resource parameter that is applied to the candidate component carrier to form configuration information about the candidate component carrier; and delivering the configuration information about the candidate component carrier to the UE.

The storage medium may be an ROM/RAM, a magnetic disk, and an optical disk.

The method for configuring a component carrier in a carrier aggregation scenario is described in detail in the preceding, and a structure of a corresponding apparatus is described in the following through embodiments.

Figure 5:
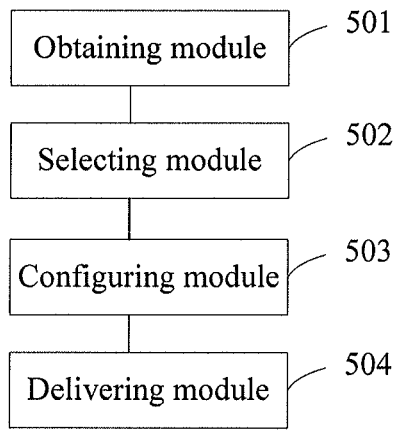
FIG. 5 is a schematic structural diagram of a base station according to an embodiment of the present invention.

FIG. 5 is a schematic structural diagram of a base station according to an embodiment of the present invention.

The base station may include:

an obtaining module 501, adapted to obtain information about a component carrier supported by a UE;

a selecting module 502, adapted to select a candidate component carrier according to the information about the component carrier;

a configuring module 503, adapted to configure a resource parameter that is applied to the candidate component carrier to form configuration information about the candidate component carrier; and a delivering module 504, adapted to deliver the configuration information about the candidate component carrier to the UE.

In the base station, after the obtaining module 501 obtains the information about the component carrier supported by the UE, the selecting module 502 may select the candidate component carrier for the UE according to factors such as the number of component carriers supported by the UE and a load of each component carrier of a cell, and the configuring module 503 configures a relevant parameter of a resource for the UE to form the configuration information about the candidate component carrier, and finally, the delivering module 504 delivers the configuration information about the candidate component carrier, namely, information about the candidate component carrier and information about a configured parameter, to the UE.

In this embodiment, through each module, the base station perceives and analyzes a support status of a component carrier on a UE side, and configures the component carrier of the UE, so that configuration of the component carrier is kept consistent between the UE and the base station, and correct data transmission is ensured.

Figure 6:
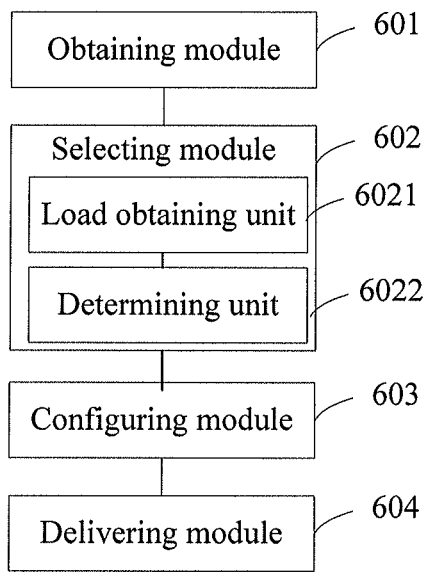
FIG. 6 is a schematic structural diagram of another base station according to an embodiment of the present invention.

FIG. 6 is a schematic structural diagram of another base station according to an embodiment of the present invention.

The base station may also include an obtaining module 601, a selecting module 602, a configuring module 603, and a delivering module 604, and except the selecting module 602, all the modules are similar to the corresponding modules in the preceding embodiment and are not repeatedly described here.

In this embodiment, the selecting module 602 may further include a load obtaining unit 6021 and a determining unit 6022.

The load obtaining unit 6021 is adapted to obtain a load of each component carrier supported by a UE.

The determining unit 6022 is adapted to determine a component carrier whose load is smaller than a threshold as a candidate component carrier.

In the selecting module 602, the load obtaining unit 6021 obtains a load status of each component carrier, and the determining unit 6022 may measure each component carrier according to the load status and determine a component carrier whose load is smaller than a threshold as a candidate component carrier to be allocated to the UE, so that configuration of the component carrier is optimized.

In another embodiment of the present invention, if the information about the component carrier supported by the UE, where the information about the component carrier is obtained by the obtaining module 601, further includes information about channel quality of each component carrier, the determining unit 6022 included in the selecting module 602 is adapted to determine a component carrier whose load is smaller than a threshold and channel quality is larger than a threshold as the candidate component carrier. The candidate component carrier determined by the base station through the determining unit is more reliable, so that data transmission is ensured.

The obtaining module 601 of the base station may further obtain status change information about a component carrier on a UE side, such as decrease or increase of the number of component carriers, and channel quality of each component carrier, and according to an analysis performed by the base station according to a change situation of the component carrier on the UE side or channel quality of the component carrier on the UE side, the selecting module 602 and the configuring module 603 may modify a component carrier used by the UE or a set of component carriers used by the UE, for example, add or delete a component carrier, or modify some parameters, and then the delivering module 604 notifies the UE through an RRC message.

Figure 7:
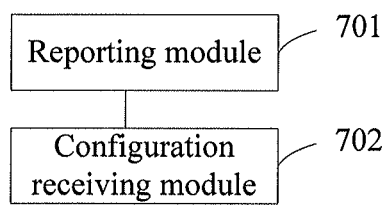
FIG. 7 is a schematic structural diagram of a mobile terminal according to an embodiment of the present invention.

FIG. 7 is a schematic structural diagram of a mobile terminal according to an embodiment of the present invention.

In this embodiment, a mobile terminal may include a reporting module 701 and a configuration receiving module 702.

The reporting module 701 is adapted to report support information about a component carrier to a base station. The configuration receiving module 702 is adapted to receive configuration information about a candidate component carrier, namely, information about the candidate component carrier and information about a resource parameter that is applied to the candidate component carrier, where the information about the candidate component carrier is delivered by the base station.

The mobile terminal may report, through the reporting module 701, component carriers that the mobile terminal can support simultaneously and the number of the component carriers, and may also simultaneously report a channel condition of each component carrier, such as RSRP, and then, after the base station performs an analysis and judgment according to the reported information, the base station selects a candidate component carrier for the mobile terminal and configures a resource parameter. The mobile terminal receives configuration of the base station through the configuration receiving module 702, and after that, may apply a relevant parameter of a resource configuration to a corresponding component carrier, such as activation, modification, and release of the resource, so as to complete scheduling of the resource and handover on each component carrier.

In this embodiment of the present invention, the reporting module 701 reports the support information about the component carrier, so that the base station may configure the component carrier of the mobile terminal according to the support information, and therefore, after the configuration receiving module 702 of the mobile terminal receives configuration information about the component carrier, the mobile terminal can accurately know to which component carrier a resource parameter is applied. Thus, data transmission may be performed or a data transmission error may be reduced.

Figure 8:
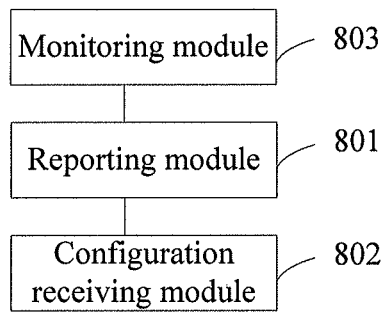
FIG. 8 is a schematic structural diagram of another mobile terminal according to an embodiment of the present invention.

FIG. 8 is a schematic structural diagram of another mobile terminal according to an embodiment of the present invention.

In this embodiment, the mobile terminal may further include a monitoring module 803 in addition to a reporting module 801 and a configuration receiving module 802. The reporting module 801 and the configuration receiving module 802 are respectively similar to the reporting module 701 and the configuration receiving module 702 in the preceding embodiment, and are not repeatedly described here.

The monitoring module 803 is adapted to monitor broadcast system information to obtain a component carrier support information list of a cell.

By monitoring and measuring broadcast system information about the cell through the monitoring module 803, the mobile terminal mobile terminal may obtain the total number of component carriers of the cell and information about a relevant status, such as a channel condition of each component carrier. The monitoring may be real-time monitoring, timed monitoring, or event-driven monitoring, which may be set according to a requirement. Taking the timed monitoring as an example, a timer may be set to perform timed monitoring. Then, the reporting module 801 reports to the base station support information about a component carrier, where the support information about the component carrier is obtained by the monitoring, and the configuration receiving module 802 receives configuration information about a component carrier of the base station. The configuration information may include at least one component carrier and a parameter for configuring a resource, where the parameter for configuring a resource is applied to a corresponding component carrier, and may also include a set of component carriers and a parameters for configuring a resource, where the parameter for configuring a resource is applicable to all component carriers in the set. After receiving configuration of the base station, the mobile terminal may apply a relevant parameter for configuring a resource to a corresponding component carrier, such as activation, modification, and release of the resource, so as to complete scheduling of the resource and handover on each component carrier.

In this embodiment, the monitoring module 803 monitors the broadcast system information about the cell to obtain the component carrier support information list, so that accuracy of the component carrier support information reported to the base station is improved, and the component carrier support information may also be reported to the base station according to a change situation of the component carrier of the cell, so that new configuration information may be obtained in time, thus improving accuracy of data transmission.

In another mobile terminal according to an embodiment of the present invention, the monitoring module 803 of the mobile terminal may also be replaced with a receiving module. The receiving module is adapted to receive component carrier support information notified by a cell after the mobile terminal goes into a connected state.

This embodiment is different from the preceding embodiment in that in the preceding embodiment, the mobile terminal monitors the broadcast system information about the cell through the monitoring module 803 to obtain the component carrier support information list, while in this embodiment, the mobile terminal receives a dedicated signaling notification from a cell through the receiving module to obtain component carrier support information. In this embodiment, a component carrier support information list may also be obtained through the receiving module, so that accuracy of component carrier support information reported to a base station is improved, and a report may also be made to the base station according to a change situation of a component carrier of the cell, so that new configuration information may be obtained in time, thus improving accuracy of data transmission.

Figure 9:
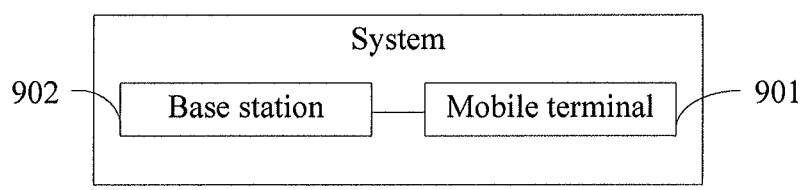
FIG. 9 is a schematic structural diagram of a system for configuring a component carrier in a carrier aggregation scenario according to an embodiment of the present invention.

FIG. 9 is a schematic structural diagram of a system for configuring a component carrier in a carrier aggregation scenario according to an embodiment of the present invention.

In this embodiment, the system may include a mobile terminal 901 and a base station 902.

The base station 902 is adapted to obtain information about a component carrier supported by the mobile terminal 901; select a candidate component carrier according to the information about the component carrier and configure a resource parameter that is applied to the candidate component carrier to form configuration information about the candidate component carrier; and deliver the configuration information about the candidate component carrier, namely, the candidate component carrier and a configured resource parameter, to the mobile terminal 901.

In this embodiment of the present invention, the base station 902 perceives and analyzes a support status of a component carrier on a mobile terminal side and configures a component carrier of the mobile terminal, so that configuration of the component carrier is kept consistent between the mobile terminal and the base station, and thus correct data transmission is ensured.

Figure 10:
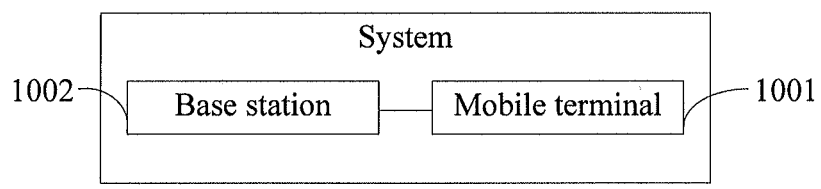
FIG. 10 is a schematic structural diagram of a system for configuring a component carrier in another carrier aggregation scenario according to an embodiment of the present invention.

FIG. 10 is a schematic structural diagram of a system for configuring a component carrier in another carrier aggregation scenario according to an embodiment of the present invention.

In this embodiment, the system may include a mobile terminal 1001 and a base station 1002.

The mobile terminal 1001 is adapted to report support information about a component carrier to the base station 1002; and receive configuration information about a candidate component carrier, where the configuration information about the candidate component carrier is delivered by the base station 1002.

In this embodiment of the present invention, the mobile terminal 1001 reports the support information about the component carrier, so that the base station 1002 may configure a component carrier of the mobile terminal 1001 according to the support information, and therefore, after the mobile terminal 1001 receives the configuration information about the candidate component carrier, the mobile terminal 1001 can accurately know to which component carrier a resource parameter is applied. Thus, data transmission may be performed or a data transmission error may be reduced.

For a specific implementation process of the preceding apparatus embodiments, reference may be made to the description of corresponding parts of the method embodiments, which is not repeatedly described here.

The embodiments of the present invention in the preceding description are not intended to limit the protection scope of the present invention. Any modification, equivalent substitution, and improvement within the spirit and principle of the present invention shall fall within the protection scope defined by the appended claims of the present invention.

What is claimed is:

1. A method for configuring a component carrier in a carrier aggregation scenario, comprising:
    monitoring broadcast system information;
    obtaining information about a component carrier supported by a user equipment (UE) through the monitoring, wherein the information about the component carrier supported by the UE comprises channel quality of each component carrier;
    selecting a candidate component carrier according to the information about the component carrier and configuring a resource parameter that is applied to the candidate component carrier to form configuration information about the candidate component carrier, wherein selecting the candidate component carrier according to the information about the component carrier comprises:

obtaining a load of each component carrier supported by the UE, and determining a component carrier whose load of each is smaller than a threshold and channel quality is larger than a threshold as the candidate component carrier; and delivering the configuration information about the candidate component carrier to the UE.

2. The method according to claim 1, wherein the selecting the candidate component carrier according to the information about the component carrier specifically comprises:

obtaining a load of each component carrier supported by the UE; and determining a component carrier whose load is smaller than a threshold as the candidate component carrier.

3. The method according to claim 1, wherein the information about the component carrier supported by the UE specifically is:

component carrier support information about a cell to which the UE belongs, wherein the component carrier support information is obtained by the UE through monitoring broadcast system information; or component carrier support information that is notified through dedicated signaling by the cell to which the UE belongs after the UE goes into a connected state; or status change information about the component carrier supported by the UE.

4. The method according to claim 1, wherein the resource parameter comprises: a semi-static scheduling period, a physical uplink control channel resource, a number of hybrid automatic repeat request processes, and a condition for implicit release.

5. The method according to claim 1, wherein the candidate component carrier is a set that comprises at least one component carrier.

6. The method according to claim 5, wherein the resource parameter that is applied to the candidate component carrier is a parameter for configuring a resource, wherein the parameter for configuring a resource is applicable to all component carriers in the set.

7. A method for configuring a component carrier in a carrier aggregation scenario, comprising:

obtaining information about a component carrier supported by a user equipment (UE), wherein the information about the component carrier supported by the UE comprises channel quality of each component carrier;

selecting a candidate component carrier according to the information about the component carrier and configuring a resource parameter that is applied to the candidate component carrier to form configuration information about the candidate component carrier, wherein selecting the candidate component carrier according to the information about the component carrier comprises: obtaining a load of each component carrier supported by the UE, and determining a component carrier whose load is smaller than a threshold and channel quality is larger than a threshold as the candidate component carrier; and delivering the configuration information about the candidate component carrier to the UE;

if a resource is in an active state on a certain component carrier, delivering to the UE a resource activation command indicating that the resource is on another component carrier, so that the UE uses the resource activation command to apply the resource on said another component carrier, and releases a resource on a certain original component carrier, wherein the certain component carrier and said another component carrier are candidate component carriers.

8. A base station, comprising:

a monitoring module, configured to monitor broadcast system information;

an obtaining module, adapted to obtain information about a component carrier supported by a user equipment (UE), wherein the information about the component carrier supported by the UE comprises channel quality of each component carrier;

a selecting module, configured to select a candidate component carrier according to the information about the component carrier, wherein the selecting module comprises: a load obtaining unit, configured to obtain a load of each component carrier supported by the UE; and a determining unit, configured to determine a component carrier whose load is smaller than a threshold as the candidate component carrier;

a configuring module, configured to configure a resource parameter that is applied to the candidate component carrier to form configuration information about the candidate component carrier; and a delivering module, configured to deliver the configuration information about the candidate component carrier to the UE.

9. The base station according to claim 8, wherein the information about the component carrier supported by the UE further comprises channel quality of each component carrier, wherein the information about the component carrier is obtained by the obtaining module.

10. The base station according to claim 9, wherein the determining unit is configured to determine a component carrier whose channel quality is larger than a threshold as the candidate component carrier.

11. A mobile terminal, comprising:

a monitoring module, configured to monitor broadcast system information;

a reporting module, configured to report information about a supported component carrier to a base station, wherein the information about the component carrier comprises channel quality of each component carrier; and a configuration receiving module, configured to receive configuration information about a candidate component carrier, wherein the candidate component carrier is selected according to the information about the component carrier, wherein the information comprises: a load of each component carrier supported by the mobile terminal, and a component carrier whose load is smaller than a threshold, wherein the configuration information about the candidate component carrier is delivered by the base station.

12. The mobile terminal according to claim 11, further comprising: a receiving module, adapted to receive component carrier support information notified by the cell through dedicated signaling after the mobile terminal goes into a connected state.

\* \* \* \* \*